INVENTOR.
Martin Galbraith
BY Wendell T. Burbank

ATTORNEY.

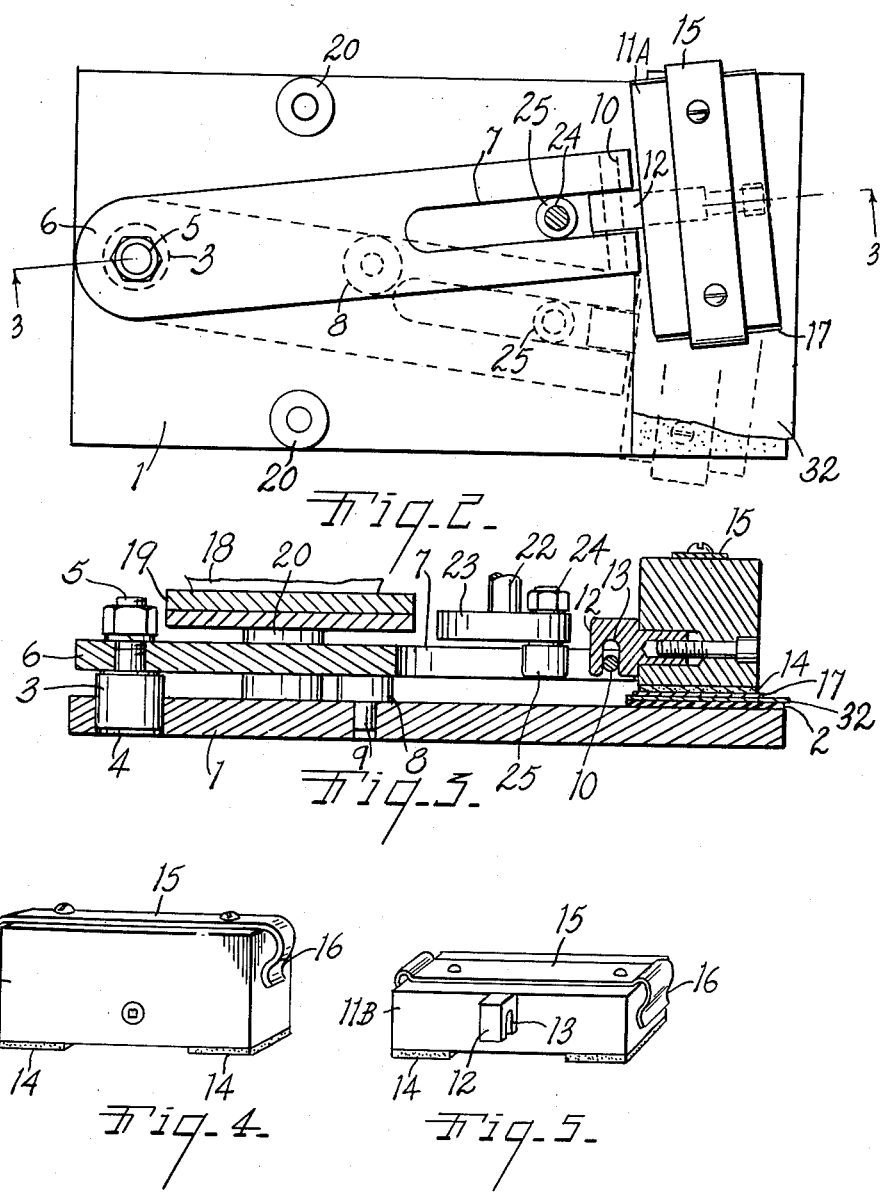

United States Patent Office 2,734,375
Patented Feb. 14, 1956

2,734,375

APPARATUS FOR TESTING ABRASION RESISTANCE OF PRINTED SURFACES

Martin Galbraith, Kalamazoo, and Wendell T. Burbank, Three Rivers, Mich., assignors to Sutherland Paper Company, Kalamazoo, Mich.

Application April 22, 1952, Serial No. 283,684

7 Claims. (Cl. 73—7)

This invention relates to improvements in apparatus for testing abrasion resistance of printed surfaces.

The principal objects of this invention are:

First, to provide an apparatus that will reproduce abrasion forces on a sample of printed paper that are identical in pressure and duration.

Second, to provide an apparatus that will oscillate a test block in freely supported relation over the surface of a printed sample for a predeterminable variable number of strokes.

Third, to provide a testing apparatus for identically reproducing various preselected rubbing operations between a printed surface and the surface of a strip of test paper.

Fourth, to provide means for testing the abrasion resistance properties of inks on various papers and under various conditions by reproducing identical abrasion forces and conditions and comparing the results of various tests.

Fifth, to provide apparatus for testing abrasion resistance properties and other properties of printed surfaces which will permit printers to predetermine the quality of various inks when used on various surfaces to be printed.

Other objects and advantages of the invention will be apparent from a consideration of the following description and claims.

The drawings of which there are two sheets illustrate a highly practical form of the apparatus and the several steps for carrying out the invention:

Fig. 2 is a plan view of the base and operating arm of the apparatus with the driving motor and timing apparatus removed.

Fig. 3 is a fragmentary vertical, longitudinal cross sectional view through the base taken along the plane of the line 3—3 in Fig. 2.

Fig. 4 is a perspective view of a first abrasion block employed with the apparatus.

Fig. 5 is a perspective view of a second abrasion block employed with the apparatus and viewed from the opposite side of the block shown in Fig. 4.

Figure 1:
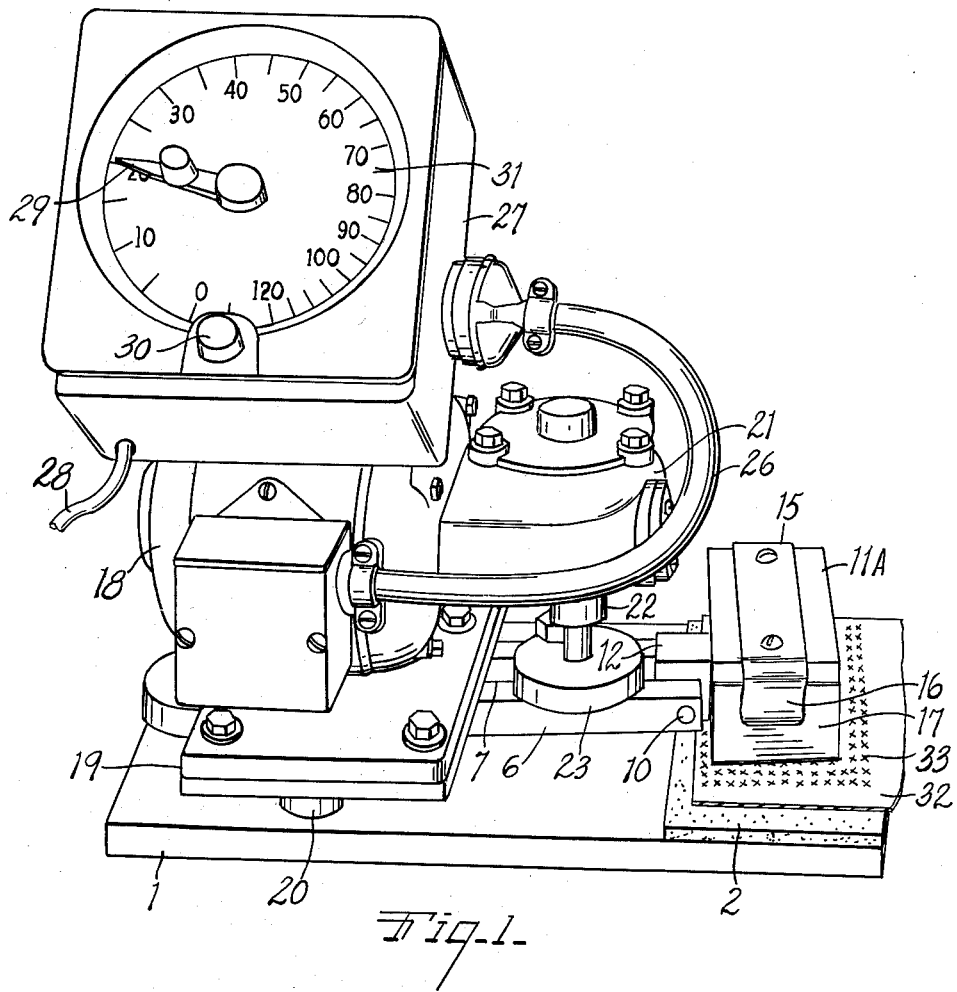
Fig. 1 is a perspective view of the testing apparatus in operative position.

In the art of printing generally and more particularly in the art of printing paperboard cartons it is often desirable to predetermine how a particular batch of ink will react when the ink is applied or printed on a particular carton and the carton subjected to different conditions of abrasion, and presence or absence of moisture. Heretofore it has been impossible to pretest inks for this purpose and the present invention provides means for predetermining how a particular carton printed with a particular ink will react to various conditions encountered in the handling of a carton. Generally the invention consists in reproducing identical abrasive acts on a sample of a paperboard to be used in a carton and printed with the ink to be tested. The results of the abrasion tests are compared with results obtained with different inks and different samples of paperboard that have been submitted to identical tests. The apparatus which forms a part of the invention provides means for identically reproducing abrasion forces on the test sample. That is, the sample is subjected to the same number of abrasive strokes applied at the same pressure. The apparatus is adjustable for varying the number of abrasive strokes and their pressure as different properties of the sample and the characteristics of the sample to be tested are changed.

The apparatus comprises a flat base plate 1 desirably of metal. The right end of the plate as viewed in the drawing is provided with a relatively thin pad 2 of deformable material such as sponge rubber. The pad is of uniform thickness and perfectly flat on its surfaces. A bushing 3 is rotatably received in a hole 4 at the left end of the plate and carries an upstanding stud 5 to which the left end of an arm 6 is securely fastened. The arm 6 extends longitudinally over the plate 1 to adjacent the pad 2 and is vertically slotted as at 7 from its swinging end. A flat pad or bearing 8 secured to the plate 1 by a depending peg 9 slidably supports the arm intermediate of its ends. A pin 10 extends across the open end of the slot 7.

Adapted to coact with the arm 6 and the pad 2 are two or more blocks 11A and 11B. As is best illustrated in Figs. 4 and 5 the blocks differ only in height so that they have the same bottom surface and size but are different in weight. The blocks have secured to one side an ear 12 that is vertically slotted as at 13 from the underside to hook over the pin 10 with the ear projecting into the slot 7 of the arm. The slot 13 is deep enough so that the block is not supported vertically by the pin. The undersurfaces of the blocks are provided with flat shoes 14 at each end which consist of small rectangles of deformable material such as sponge rubber. Spring grips 15 are secured to the tops of the blocks with downturned ends 16 extending over the ends of the blocks to springably engage and hold the ends of strips 17 of test paper as illustrated in Fig. 1.

In order to oscillate the arm 6 and the block connected to the end thereof, the apparatus is provided with a motor 18. The motor is mounted on a base plate 19 and the base plate is supported in spaced relationship above the arm 6 by a pair of posts 20 secured to the base plate 1 on opposite side of arm 1. The motor carries a gear box or transmission 21 that projects over the right edge of the base plate 19 so that a crank shaft 22 depending from the transmission will be positioned over the arm 6. The crank shaft carries a crank wheel 23 and the wheel carries a depending crank pin 24 eccentrically mounted on the wheel. A bearing 25 carried on the pin 24 slidably and drivingly engages the sides of the slot 7 in the arm.

The motor 18 is supplied with energy through the cable 26 from a timing device 27 mounted on top of the motor. The timing device is a commercially available article and it is believed sufficient to an understanding of the invention to point out that the timing device is an adjustably timed switching mechanism that will energize cable 26 from a power source such as the cable 28 during a predeterminable adjustable timed interval. The timing device includes an adjusting lever 29 which can be moved to vary the interval during which the cable 26 will be energized and a control button 30 adapted to start the timing device through its timed interval. The lever 29 coacts with a calibrated scale 31 so that the operator can select the desired interval of operation for the motor 18. The scale 31 maybe calibrated in seconds and with the rotational speed of the motor 18 and the gear ratio of the transmission 21 known this maybe converted or calculated into a predeterminable number of oscillations of the arm 16 and block 11. More desirably the scale 31 is calibrated directly in the number of oscillations of the arm and block. It is pointed out that the motor 18 is relatively large and of sufficient capacity with respect to the load imposed by the block 11 to practically instantaneously bring the speed of oscillation of the arm and block up to the full rated speed of the motor.

In operating the apparatus of the invention a sample piece of paperboard 32 is imprinted with the ink to be tested as at 33 and after the ink has dried, the sample is placed on the pad 2 where the rubber like character of the pad retains the sample in place. One of the test blocks 11A and 11B is then fitted with a strip of test paper or cardboard 17 and engaged with the pin 10 so that the test strip 17 is pressed at a given and accurately reproducible pressure against the printed area 33. The lever 29 is adjusted to a reproducible number of strokes and the control button 30 actuated to oscillate the block a given number of times. It is pointed out that the test strips 17 and printed area 33 may be wet or dry as desired to simulate conditions to which the carton and ink will be subjected. After the test, the condition of the surface of the sample 32 and the test strip 17 can be observed and recorded and the samples filed for comparison for prior or later test under identical conditions.

The following specifications for the apparatus and the following test procedures are suggested. The blocks 11A and 11B may weigh respectively four and two pounds. The shoes 14 may each be one by two inches in size providing an effective contact area of four square inches for each block. Thus the heavier block 11A will provide a contact pressure of one pound per square inch while the smaller block provides a contact pressure of one-half pound per square inch. The motor 18 and transmission 21 may be designed to oscillate the blocks at the rate of 43.1 strokes per minute.

To test the abrasion resistant properties of a printed sample, attach a seven and one-half by two inch unprinted blank of the paperboard or paper to be tested to the four pound block with the printing surface away from the shoes. In the case of heavy paper board, the test strip may be scored to facilitate bending the strip around the bottom of the block. The printed sample is placed on the pad as previously described and the apparatus is adjusted and actuated to complete 10 strokes or full oscillations of the test strip over the sample surface. 25 strokes are suggested for dry rub tests on inks under an overprinted varnish.

For wet abrasion tests the two pound block is used. Three to six drops of water are placed on the printed surface. The apparatus is actuated to complete successive single strokes and the samples are examined after each stroke. The test is continued until ink failure is noted, or the surface of the test strip shows fuzz or abrasion.

To test a printed sample for wet bleed or transfer, a strip of blotting paper having the specifications of the Technical Association of the Pulp and Paper Industry for Standard 205M-50 is applied to the two pound block with the felt or smooth side out. The blotting paper is saturated with water and the test strip and block are placed on the test sample for four minutes. The block is then removed without rubbing and examined for ink transfer to the blotter.

For resistance to wet smear a sample may be tested by mounting the same type of wet blotter on the two pound block and oscillating the test strip in successive single strokes over the sample after the wet test strip has been rested on the sample for four minutes as in the test for wet bleed or transfer.

The apparatus may further be employed to predetermine the reaction of printed samples to various elements or mixtures with which they may be expected to come in contact. For instance, a small quantity of the product to be packaged in a container may be applied to the test strip and rubbed a predetermined number of times over the printed sample.

By employing the apparatus it is often possible to avoid the expense of setting up a color press and placing it in operation with a particular ink only to find that the ink is unsuitable and must be removed and cleaned from the press.

Having thus described our invention, what we claim as new and desire to secure by Letters Patent is:

1. Apparatus for testing printed surfaces comprising, a flat base plate having a flat pad of deformable non-slippery material secured to its upper surface and at one end of the plate, an arm extending along the top of said plate and having a pivot connection thereto at the opposite end thereof from said pad, a bearing on said plate slidably supporting said arm intermediate of its ends, the swinging end of said arm being vertically and longitudinally slotted and terminating adjacent said pad, a pin horizontally bridging said slot in said arm in the outer end thereof, a motor support carried by said plate and overlying an intermediate portion of said arm, a motor mounted on said support and having a gear box projecting over the swinging end of said arm, a crank shaft driven from said motor and said gear box and projecting downwardly toward said arm, a crank pin on said shaft drivingly engaged in said slot in said arm to oscillate the arm, an adjustable time switching device mounted on said motor, electrical connections between said device and said motor operative to energize said motor for predetermined intervals, a weight block having a hooked ear on one side removably engageable within the end of the slot of said arm and over said pin whereby said block may be freely oscillated across the surface of said pad, flat shoe elements of deformable material mounted on the underside of said block and at opposite ends thereof, and a clip on said block and extending over the ends thereof and adapted to retain the ends of paper test strips positioned along the bottom of said shoe and folded upwardly along the ends of the block.

2. Apparatus for testing printed surfaces comprising, a base having a flat pad with a soft non-slippery surface secured to its upper surface and at one end of the base, an arm extending along the top of said base and having a pivot connection thereto at the opposite end thereof from said pad, a bearing on said base slidably supporting said arm intermediate of its ends, the swinging end of said arm being vertically and longitudinally slotted and terminating adjacent said pad, a pin horizontally bridging said slot in said arm in the outer end thereof, a motor mounted on said base and having a gear box projecting over the swinging end of said arm, a crank shaft driving from said motor and said gear box and projecting downwardly toward said arm, a crank pin on said shaft drivingly engaged in said slot in said arm to oscillate the arm, an adjustable timed switching device mounted on said base, electrical connections between said device and said motor operative to energize said motor for predetermined intervals, a weight block having a hooked ear on one side removably engageable within the end of the slot of said arm and over said pin whereby said block may be freely oscillated across the surface of said pad, flat shoe elements of soft material mounted on the undersides of said block and at opposite ends thereof, and a clip on said block and extending over the ends thereof and adapted to retain the ends of paper test strips positioned along the bottom of said shoe and folded upwardly along the ends of the block.

3. Apparatus for testing printed surfaces comprising, a base having a flat non-slippery upper surface at one end thereof, an arm extending along the top of said base and having a pivot connection thereto at the opposite end thereof from said surface, a bearing on said base slidably supporting said arm intermediate of its ends, the swinging end of said arm being vertically and longitudinally slotted and terminating adjacent said surface, a pin horizontally bridging said slot in said arm in the outer end thereof, a motor mounted on said base and having a gear box projecting over the swinging end of said arm, a crank shaft driven from said motor and said gear box and projecting downwardly toward said arm, a crank pin on said shaft drivingly engaged in said slot in said arm to oscillate the arm, an adjustable timed switching device mounted on said base, electrical connections between said device and said motor operative to energize said motor from said device, a weight block having a hooked ear on one side removably engageable within the end of the slot of said arm and over said pin whereby said block may be freely oscillated across said surface, and a clip on said block and extending over the ends thereof and adapted to retain the ends of a paper test strip positioned along the bottom of said block and folded upwardly along the ends of the block.

4. Apparatus for testing printed surfaces comprising, a base having a flat non-slippery upper surface at one end thereof, an arm extending along the top of said base and having a pivot connection thereto at the opposite end thereof from said surface, said arm being vertically and longitudinally slotted and terminating adjacent said surface, a motor mounted on said base and having a gear box projecting over the swinging end of said arm, a crank shaft driven from said motor and said gear box and projecting downwardly toward said arm, a crank pin on said shaft drivingly engaged in said slot in said arm to oscillate the arm, an adjustable timed switching device mounted on said base, electrical connections between said device and said motor operative to energize said motor from said device, a weight block having a horizontally driving but vertically unsupported connection to the end of said arm whereby said block may be freely oscillated across said surface, and a clip on said block and extending over the ends thereof and adapted to retain the ends of a paper test strip positioned along the bottom of said block and folded upwardly along the ends of the block.

5. Apparatus for testing ink on printed surfaces comprising, a base, a flat non-slippery surface at one end of the base, an arm extending along the top of said base and having a pivot connection thereto at the opposite end thereof from said surface, a bearing on said base slidably supporting said arm intermediate of its ends, means drivingly engaged with said arm to oscillate the arm, an adjustable timed switching device mounted on said base and connected to energize said means for predetermined intervals, a weight block having vertically unsupported horizontally driving releasable connection to the end of said arm to be oscillated thereby over said surface, flat shoe elements of deformable material mounted on the underside of said block and at opposite ends thereof, and means on said block adapted to retain the ends of paper test strips positioned along the bottom of said block and folded upwardly along the ends of the block.

6. Apparatus for testing ink on printed surfaces comprising, a base, a flat surface at one end of the base, an arm extending along the top of said base and having a pivot connection thereto at the opposite end thereof from said surface, means drivingly engaged with said arm to oscillate the arm, an adjustable timed switching device connected to energize said means for predetermined intervals, a weight block having a vertically unsupported horizontally driving releasable connection to the end of said arm to be oscillated thereby over said surface, and means on said block adapted to retain the ends of paper test strips positioned along the bottom of said block and folded upwardly along the ends of the block.

7. An apparatus for testing a printed area on fibrous material comprising a supporting base, a pad on said base, an arm pivotally mounted on said base to swing in a horizontal plane and with its swinging end adjacent said pad, means for oscillating said arm and provided with means for variably predetermining the number of testing strokes of the arm, a weight member floatingly connected to the swinging end of said arm to be oscillated therewith above said pad, and means for attaching a test strip to the underside of the weight member for coaction with a printed surface supported by the pad.

References Cited in the file of this patent
UNITED STATES PATENTS

| | | |
|---|---|---|
| 1,483,662 | Jamar | Feb. 12, 1924 |
| 2,051,464 | Bradner et al. | Aug. 18, 1936 |
| 2,114,831 | Durfee | Apr. 19, 1938 |
| 2,221,964 | De Verdier | Nov. 19, 1940 |
| 2,316,518 | Klenke, Jr. | Apr. 13, 1943 |
| 2,414,439 | Brandon | Jan. 21, 1947 |